United States Patent [19]
Saibara et al.

[11] Patent Number: 6,013,124
[45] Date of Patent: *Jan. 11, 2000

[54] PIGMENT INK FOR INK-JET RECORDING

[75] Inventors: Shoji Saibara; Sachie Kawadu, both of Toride; Shigeo Aoyama, Ibaraki; Yuichi Sakurai, Toride, all of Japan

[73] Assignee: Hitachi Maxell, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/937,607

[22] Filed: Sep. 25, 1997

[30] Foreign Application Priority Data

Sep. 25, 1996 [JP] Japan .................................... 8-252127
Feb. 24, 1997 [JP] Japan .................................... 9-038684

[51] Int. Cl.$^7$ .................................... C09D 11/02
[52] U.S. Cl. .................................... 106/31.86; 106/31.89
[58] Field of Search ................................ 106/31.86, 31.89

[56] References Cited

U.S. PATENT DOCUMENTS

| | | | |
|---|---|---|---|
| 5,141,556 | 8/1992 | Matrick | 106/31.58 |
| 5,169,438 | 12/1992 | Matrick | 106/31.86 |
| 5,180,425 | 1/1993 | Matrick et al. | 106/31.58 |
| 5,281,262 | 1/1994 | Saito | 106/31.86 |
| 5,656,071 | 8/1997 | Kappele et al. | 106/31.86 |
| 5,769,930 | 6/1998 | Sano et al. | 106/31.86 |
| 5,772,746 | 6/1998 | Sawada et al. | 106/31.89 |

FOREIGN PATENT DOCUMENTS 3-157464  7/1991  Japan.

*Primary Examiner*—Helene Klemanski
*Attorney, Agent, or Firm*—Birch, Stewart, Kolasch & Birch, L.L.P.

[57] ABSTRACT

A pigment ink for ink-jet recording comprises a pigment, a polyethylene oxide-containing dispersing agent, a water-soluble organic solvent, polyethylene oxide, and water. In place of polyethylene oxide, it is possible to use a water-soluble compound having a structure in which two or three hydroxyl groups are joined to a hydrocarbon having a number of carbons of 4 to 6. The ink does not cause any head clogging, and it is excellent in printing quality.

16 Claims, No Drawings

PIGMENT INK FOR INK-JET RECORDING

FIELD OF THE INVENTION

The present invention relates to a pigment ink, especially a pigment ink which is appropriately used for the ink-jet recording system for performing recording by discharging ink droplets from a printing head. In particular, the present invention relates to a pigment ink which is excellent in discharge performance and printing quality when it is used in an ink-jet recording apparatus.

DESCRIPTION OF THE RELATED ART

The dye inks which is obtained by dissolving various dyes, for example, in water or a mixed solvent comprising water and an organic solvent, has been used in conventional ink-jet recording However, the dye ink has the following drawbacks. Namely, for example, the printing quality of the dye ink is not sufficient due to blurring, and the light resistance and the water resistance are inferior.

For this reason, research and development are now also performed for the pigment ink which scarcely suffers blurring, and which is excellent in printing quality, as well as excellent in light resistance and water resistance. However, the pigment ink is based on the use of a water-insoluble pigment. Therefore, it causes problems concerning, for example, dispersion stability of pigment particles in the ink, and clogging of the nozzle of the printing head.

Conventionally, when the nozzle clogging occurs in the printing head, several methods are adopted. For example, in order to remove the clogging, a cleaning mechanism is provided in the printer apparatus. In order to avoid the nozzle clogging, a cap is attached to the nozzle when it is not used to prevent the ink from drying. In the case of the dye ink, even when solid matters are produced in the nozzle unit due to drying of the ink, they can be easily dissolved again by the aid of the cleaning operation. However, since the pigment ink uses the water-insoluble pigment, the pigment is agglomerated when the ink is dried, resulting in production of solid matters which are difficult to be dissolved again. As described above, the problem of nozzle clogging makes a cause which delays the development of the pigment ink to be practically used.

In order to solve the problem described above, for example, a technique has been suggested in Japanese Laid-Open Patent Publication No. 3-157464. This technique lies in an ink composition comprising a pigment, a polymer dispersing agent, an aqueous medium and a penetrating agent, wherein the aqueous medium comprises water, a non-volatile organic solvent, and a lower alcohol. It is stated that the non-volatile solvent is preferably used in an amount of 30 to 80 parts by weight with respect to 100 parts by weight of water.

According to this patent document, the clogging is improved, and an excellent drying speed is obtained by the addition of the large amount of the non-volatile solvent. However, in view of the development in high definition printing and high speed printing achieved by recent ink-jet printers, the drying speed is insufficient because of the non-volatile solvent contained in the amount as described in Japanese Laid-Open Patent Publication No. 3-157464. Further, the viscosity of the ink is increased, making it impossible to satisfy the quality required for high speed and high definition printing.

SUMMARY OF THE INVENTION

An object of the present invention is to provide a pigment ink to be used for ink-jet recording, the pigment ink being excellent in printing quality without causing any nozzle clogging in the printing head.

According to a first aspect of the present invention, there is provided a pigment ink for ink-jet recording, comprising (A) a pigments (B) a polyethylene oxide-containing dispersing agents (C) at least one water-soluble organic solvent selected from the group consisting of ethylene glycol, diethylene glycol, and glycerol, (D) polyethylene oxides and (E) water.

According to our finding, it is assumed that the reason why the nozzle clogging is improved is that solid matters produced by drying of the pigment ink have a soft property. Therefore, for examples when the cleaning operation is performed, the solid matters are easily dissolved again, and they are peeled off from the nozzle, making it possible to perform normal printing. Thus, it is possible to provide the pigment ink which is excellent in printing quality, and which does not cause any nozzle clogging.

The mechanism, in accordance with which the pigment ink used in the present invention exhibits the foregoing excellent result, is indefinite. However, the polyethylene oxide-containing dispersing agent adsorbed to the pigment surface has the same or similar structure as that of the polyethylene oxide, and hence they have high affinity. Further, it is assumed that they are surrounded by water and at least one water-soluble organic solvent selected from the group consisting of ethylene glycol, diethylene glycol, and glycerol which are gathered by the aid of hydrogen bond in their surroundings. Accordingly, even when the water content in the ink is evaporated, and the ink is solidified, then the nozzle clogging can be easily avoided by means of, for example, the cleaning operation, because the solid matters have the soft property.

The polyethylene oxide (polyethylene glycol) used in the present invention is a compound represented by the following general formula (1).

$$R_1O\text{---}(CH_2CH_2O)_n\text{---}R_2 \qquad (1)$$

wherein $R_1$ and $R_2$ are independently H or $CH_3$, and n is an integer.

The polyethylene oxide preferably has a molecular weight within a range of 200 to 2000. This range is preferred in order to avoid nozzle clogging and prevent the ink from increase in viscosity.

It is preferable that the total content of the water-soluble organic solvent and the polyethylene oxide used in the present invention is 8 to 16% by weight with respect to the entire ink composition. Such a total content is preferred in order to avoid nozzle clogging and achieve an excellent printing quality without delaying the drying time.

It is preferable that the composition ratio as represented by the weight ratio of the water-soluble organic solvent to the polyethylene oxide used in the present invention is within a range of 2:1 to 1:5. This range is preferred in order to avoid nozzle clogging and achieve an excellent printing quality without delaying the drying time.

It is preferable that the weight ratio of the polyethylene oxide-containing dispersing agent to the polyethylene oxide used in the present invention is within a range of 1:5 to 1:1. This range is preferred in order not to cause any nozzle clogging.

It is preferable that the weight ratio of the pigment to the polyethylene oxide-containing dispersing agent used in the present invention is within a range of 1:2 to 3:1. This range is preferred in order to obtain an excellent printing quality.

The pigment ink for ink-jet recording may be produced in accordance with the following production method. Namely, after dispersing a liquid mixture containing at least the pigment, the polyethylene oxide-containing dispersing agent, and water, the liquid mixture is added and dispersed with the polyethylene oxide and at least one water-soluble organic solvent selected from the group consisting of ethylene glycol, diethylene glycol, and glycerol. Alternatively, the liquid mixture may be prepared by adding the water-soluble organic solvent and the polyethylene oxide at the initial stage of production, followed by performing a dispersing treatment. Various additives may be added to prepare the inks if necessary. It is also possible to firstly prepare a dispersion having a high pigment concentration, and the dispersion may be diluted by adding, for example, a solvent and various additives to prepare the ink which may be used.

According to a second aspect of the present invention, there is provided an ink comprising (A) a pigment, (B) a polyethylene oxide-containing dispersing agent, (C) at least one water-soluble organic solvent selected from the group consisting of ethylene glycol, diethylene glycol, and glycerol, (F) a water-soluble compound having a structure in which two or three hydroxyl groups are joined to a hydrocarbon having a number of carbons of 4 to 6, and (E) water.

It is assumed that the reason why the nozzle clogging is improved is that solid matters produced by drying of the pigment ink have a soft property. Therefore, for example, when the cleaning operation is performed, the solid matters are easily dissolved again, and they are peeled off from the nozzle, making it possible to conduct normal printing. Thus, it is possible to provide the pigment ink which is excellent in printing quality, and which does not cause any nozzle clogging.

The mechanism, in accordance with which the pigment ink used in the present invention exhibits the foregoing excellent result, is indefinite. However, the polyethylene oxide-containing dispersing agent adsorbed to the pigment surface, the water-soluble compound having the structure in which two or three hydroxyl groups are joined to the hydrocarbon having a number of carbons of 4 to 6, at least one water-soluble organic solvent selected from the group consisting of ethylene glycol, diethylene glycol, and glycerol, and water make interaction in the ink by the aid of, for example, hydrophobic bond and/or hydrogen bond. Accordingly, even when the water content in the ink is evaporated, and the ink is solidified, then the nozzle clogging can be easily avoided by means of, for example, the cleaning operation, because the solid matters have the soft property.

The water-soluble compound (F) used in the present invention may be a single substance or a mixture of two or more of those having the structure in which two or three hydroxyl groups are joined to the hydrocarbon having a number of carbons of 4 to 6. Those usable as the water-soluble compound (F) include, for example, 1,2-butanediol, 1,4-butanediol, 1,3-butanediol, 2,4-pentanediol, 1,5-pentanediol, 2-methyl-2,4-pentanediol, 1,2-cyclohexanediol, 1,4-cyclohexanediol, trimethylolethane, trimethylolpropane, 1,2,4-butanetriol, 1,2,6-hexanetriol, 1,2,5-pentanetriol, 3-methyl-1,5-pentanediol, and 3-hexene-2,5-diol.

It is preferable that the total content of the water-soluble organic solvent and the water-soluble compound (F) used in the present invention is 8 to 16% by weight with respect to the entire ink composition. Such a total content is preferred in order to avoid nozzle clogging and achieve an excellent printing quality without delaying the drying time.

It is preferable that the composition ratio as represented by the weight ratio of the water-soluble organic solvent to the water-soluble compound (F) used in the present invention is within a range of 2:1 to 1:5. This range is preferred in order to avoid nozzle clogging and achieve an excellent printing quality without delaying the drying time.

It is preferable that the weight ratio of the dispersing agent to the water-soluble Compound (F) used in the present invention is within a range of 1:5 to 1:1. This range is preferred in order not to cause any nozzle clogging.

It is appropriate for the polyethylene oxide-containing dispersing agent used in the present invention to contain the polyethylene oxide chain and have the group capable of adsorbing the pigment. The polyethylene oxide-containing dispersing agent preferably has a molecular weight within a range of 1000 to 5000. This range is preferred in order to avoid mutual agglomeration of pigment particles and not to increase the viscosity of the ink. No problem occurs at all when other dispersing agents are simultaneously used together.

The water-soluble organic solvent used in the present invention is at least one selected from the group consisting of ethylene glycol, diethylene glycol, and glycerol.

The pigment ink for ink-jet recording according to the second aspect of the present invention may be produced in accordance with the following production method. Namely, after dispersing a liquid mixture containing at least the pigment, the polyethylene oxide-containing dispersing agent, and water, the liquid mixture is added and dispersed with at least one water-soluble organic solvent selected from the group consisting of ethylene glycol, diethylene glycol, and glycerol and/or the water-soluble compound having the structure in which two or three hydroxyl groups are joined to the hydrocarbon having a number of carbons of 4 to 6. Alternatively, the liquid mixture may be prepared by adding the water-soluble organic solvent and the water-soluble compound at the initial stage of production, followed by performing a dispersing treatment. Various additives may be added to prepare the ink, if necessary. It is also possible to firstly prepare a dispersion having a high pigment concentration, and the dispersion may be diluted by adding for example, a solvent and various additives to prepare the ink which may be used.

The pigment, which is used in the present invention without any limitation, includes hitherto known pigments such as black, cyan, magenta, yellow, red, green, and blue. The pigment can be used in any form of dry and wet states.

The pigment, which is employed in the present invention, is used in an amount of 0.1 to 20% by weight, preferably 1.0 to 10% by weight with respect to the total ink composition. Within this range, it is possible to satisfy the tone of color and the optical concentration as the ink and satisfy the viscosity and the storage stability of the pigment ink.

The pigment ink for ink-jet recording obtained in the present invention has a surface tension of 20 to 70 dyne/cm, and it has a viscosity of 1 to 20 cP. Thus, it is possible to perform stable printing by using an ink-jet printer.

The solvent used in the present invention is a mixed solvent of water and at least one water-soluble organic solvent selected from the group consisting of ethylene glycol, diethylene glycol, and glycerol. However, no problem occurs even when organic solvents other than the above are mixed. Those usable include, for example, triethylene glycol, tripropylene glycol, dimethyl sulfoxide, diacetone alcohol, glycerol monoallyl ether, propylene glycol, polyethylene glycol, thiodiglycol, N-methyl-2-pyrrolidone, 2-pyrrolidone, γ-butyrolactone, 1,3,-dimethyl-2-imidazolidinone, sulfolane, trimethylolpropane, neopentyl glycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether, dipropylene glycol monomethyl ether, β-dihydroxyethylurea, urea, acetonitrile acetone, pentaerythritol, hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monomethyl ether, dipropylene glycol monopropyl ether, dipropylene glycol monobutyl ether, tripropylene glycol monomethyl ether, glycerol monoacetate, glycerol diacetate, glycerol triacetate, ethylene glycol monomethyl ether acetate, diethylene glycol monomethyl ether acetate, cyclohexanol, 1-butanol, 2,5-hexanediol, ethanol, n-propanol, 2-propanol, 1-methoxy-2-propanol, furfuryl alcohol, and tetrahydrofurfuryl alcohol.

When the pigment ink for ink-jet recording of the present invention is produced, it is preferable to use vessel-driving type medium mills such as ball mills, centrifuge mills, and planetary ball mills; high-speed rotary mills such as sand mills; and medium-stirring mills such as stirring vessel type mills.

In the present invention, it is possible to simultaneously use various additives hitherto used for the ink for ink-jet printers, such as antifoaming agents, sterilizing agents, and pH-adjusting agents for the ink.

The ink of the present invention is used not only as the ink for ink-jet printers but also as general water base printing inks and paints or as those for special applications such as those used for producing color filters for liquid crystal displays. Further, the ultra-fine particle organic pigment obtained in accordance with the production method of the present invention can be also used as non-aqueous inks and paints by replacing the aqueous solvent.

DESCRIPTION OF THE PREFERRED EMBODIMENTS

The present invention will be described in further detail below with reference to specified embodiments of the ink according to the present invention. However, the present invention is not limited thereto.

Embodiment 1

The following composition was ground for 15 hours by using a planetary ball mill, and then it was dispersed to obtain Liquid Dispersion A.
Magenta pigment (Chromofine Magenta 6887, produced by Dainichiseika Color & Chemicals Mfg.): 10 parts by weight; Polyethylene oxide-containing dispersing agent (Nonipole 200, produced by Sanyo Chemical Industries): 10 parts by weight;
Acetylenic glycol: 1.5 part by weight;
Ion-exchanged water: 80 parts by weight.

Materials were mixed in accordance with the following composition to prepare Pigment Ink A for ink-jet recording.
Liquid Dispersion A: 50 parts by weight;
Diethylene glycol: 7 parts by weight;
Polyethylene glycol (molecular weights 200): 5 parts by weight;
Ion-exchanged water: 37 parts by weight.

Embodiment 2

Liquid Dispersion B was obtained in the same manner as described in Embodiment 1 except that the same amount of a yellow pigment (LIONOL YELLOW GGTN, produced by Toyo Ink Mfg.) was used in place of the magenta pigment used in Embodiment 1. After that, Pigment Ink B for ink-jet recording was produced in the same manner as described in Embodiment 1.

Embodiment 3

Liquid Dispersion C was obtained in the same manner as described in Embodiment 1 except that the same amount of a cyan pigment (KET Blue 111, produced by Dainippon Ink & Chemicals Inc.) was used in place of the magenta pigment used in Embodiment 1. After that, Pigment Ink C for ink-jet recording was produced in the same manner as described in Embodiment 1.

Embodiment 4

The following composition was dispersed for 15 hours by using a planetary ball mill to obtain Liquid Dispersion D.
Carbon black pigment (Printex 150T, produced by Degussa): 10 parts by weight;
Polyethylene oxide-containing dispersing agent (Jeffermin M-2000, produced by Sun Technochemical): 10 parts by weight;
Ion-exchanged water: 80 parts by weight.

Materials were mixed in accordance with the following composition to prepare Pigment Ink D for ink-jet recording.
Liquid Dispersion D: 50 parts by weight;
Diethylene glycol: 6 parts by weight;
Polyethylene glycol (molecular weight: 200): 6 parts by weight;
Ion-exchanged water: 37 parts by weight.

Embodiment 5

Materials were mixed in accordance with the following composition to prepare Pigment Ink E for ink-jet recording.
Liquid Dispersion A prepared in Embodiment 1: 50 parts by weight;
Diethylene glycol: 7 parts by weight;
Polyethylene glycol (molecular weights 1000): 5 parts by weight;
Ion-exchanged water: 37 parts by weight.

Comparative Test 1

Materials were mixed in accordance with the following. composition to prepare Pigment Ink F for ink-jet recording
Liquid Dispersion A prepared in Embodiment 1: 50 parts by weight;
Ion-exchanged water: 50 parts by weight.

Comparative Test 2

Materials were mixed in accordance with the following composition to prepare Pigment Ink G for ink-jet recording.
Liquid Dispersion A prepared in Embodiment 1: 50 parts by weight;

Polyethylene glycol (molecular weight: 200): 15 parts by weight;
Ion-exchanged water: 37 parts by weight.

Comparative Test 3

Materials were mixed in accordance with the following composition to prepare Pigment Ink H for ink-jet recording.
Liquid Dispersion A prepared in Embodiment 1: 50 parts by weight;
Diethylene glycol: 13 parts by weight;
Ion-exchanged water: 37 parts by weight.

Comparative Test 4

The following composition was ground for 15 hours by using a planetary ball mill, and then it was dispersed to obtain Liquid Dispersion I.
Magenta pigment (Chromofine Magenta 6887, produced by Dainichiseika Color & Chemicals Mfg.): 10 parts by weight;
Sodium naphthalenesulfonate-formalin condensate: 5 parts by weight;
Acetylenic glycol: 1.5 part by weight;
Ion-exchanged water: 80 parts by weight.

Materials were mixed in accordance with the following composition to prepare Pigment Ink I for ink-jet recording.
Liquid Dispersion I: 50 parts by weight;
Diethylene glycol: 7 parts by weights
Polyethylene glycol (molecular weight: 200): 5 parts by weight;
Ion-exchanged water: 37 parts by weight.

Table 1 shows the particle diameter of the pigment in the ink obtained in the respective embodiments and tests, the viscosity, the presence or absence of head clogging, and the printing quality.

TABLE 1

|  | Particle diameter (nm) | Viscosity (cps) | Clogging | Printing quality |
| --- | --- | --- | --- | --- |
| Embodiment 1 | 35 | 3.2 | A | 1.3 |
| Embodiment 2 | 36 | 3.7 | A | 1.2 |
| Embodiment 3 | 35 | 3.1 | A | 1.2 |
| Embodiment 4 | 38 | 3.5 | A | 1.2 |
| Embodiment 5 | 34 | 3.5 | A | 1.3 |
| Com. Test 1 | 35 | 2.5 | C | <1.0 |
| Com. Test 2 | 35 | 3.5 | B | 1.0 |
| Com. Test 3 | 34 | 3.6 | C | 1.0 |
| Com. Test 4 | 61 | 5.3 | C | <1.0 |

In Table 1, the particle diameter of the pigment was determined by using a scanning type electron microscope (S-4000, produced by Hitachi). The viscosity was measured at 25° C. by using a vistometer (Type R100, produced by Toki Industries). The head clogging was evaluated as follows. After printing a certain amount of characters, the nozzle was left to stand at 50° C. for 7 days without applying any capping or the like, and then the cleaning operation was performed in order to restore the nozzle clogging. The degree of head clogging was judged after how many times of operations normal printing was successful. "A" indicates the case in which normal printing was successful after 1 to 5 times of cleaning operations. "B" indicates the case in which normal printing was successful after 6 to 10 times of cleaning operations. "C" indicates the case in which normal printing was successful after not less than 11 times of cleaning operations. The printing quality was evaluated as follows. A recording pattern was printed on a sheet of normal paper by using an ink-jet printer, and the optical density of the recording pattern was measured by using Macbeth Portable Densitometer (RD-12000, produced by Sakata Inks). The larger the optical density is, the thicker the concentration of the color of the pigment is, indicating that the ink is more appropriately used.

As clarified from Table 1, the pigment ink for ink-jet recording according to the present invention has a low viscosity, it causes no head clogging, and it is excellent in printing quality.

Embodiment 6

The following composition was ground for 15 hours by using a planetary ball mill, and then it was dispersed to obtain Liquid Dispersion A2.
Magenta pigment (Chromofine Magenta 6887, produced by Dainichiseika color & Chemicals Mfg.): 10 parts by weight;
Polyethylene oxide-containing dispersing agent (Nonipole 200, produced by Sanyo Chemical Industries): 10 parts by weight;
Acetylenic glycol: 1.5 part by weight;
Ion-exchanged water: 80 parts by weight.

Materials were mixed in accordance with the following composition to prepare Pigment Ink A2 for ink-jet recording.
Liquid Dispersion A2: 50 parts by weight;
Diethylene glycol: 7 parts by weight;
1,5-Pentanediol: 6 parts by weight;
Ion-exchanged water: 37 parts by weight.

Embodiment 7

Liquid Dispersion B2 was obtained in the same manner as described in Embodiment 6 except that the same amount of a yellow pigment (LIONOL YELLOW GGTN, produced by Toyo Ink Mfg.) was used in place of the magenta pigment used in Embodiment 6. After that, Pigment Ink B2 for ink-jet recording was produced in the same manner as described in Embodiment 6.

Embodiment 8

Liquid Dispersion C2 was obtained in the same manner as described in Embodiment 6 except that the same amount of a cyan pigment (KET Blue 111, produced by Dainippon Ink & Chemicals Inc.) was used in place of the magenta pigment used in Embodiment 6. After that, Pigment Ink C2 for ink-jet recording was produced in the same manner as described in Embodiment 6.

Embodiment 9

The following composition was dispersed for 15 hours by using a planetary ball mill to obtain Liquid Dispersion D2.
Carbon black pigment (Printex 150T, produced by Degussa): 10 parts by weight;
Polyethylene oxide-containing dispersing agent (Jeffermin M-2000, produced by Sun Technochemical): 10 parts by weight;
Ion-exchanged water: 80 parts by weight.

Materials were mixed in accordance with the following composition to prepare Pigment Ink D2 for ink-jet recording.
Liquid Dispersion D2: 50 parts by weight;
Diethylene glycol: 6 parts by weight;
1,5-Pentanediol: 7 parts by weight;
Ion-exchanged water: 37 parts by weight.

Comparative Test 5

Materials were mixed in accordance with the following composition to prepare Pigment Ink E2 for ink-jet recording.

Liquid Dispersion A2 prepared in Embodiment 6: 50 parts by weight;
Ion-exchanged water: 50 parts by weight.

Comparative Test 6

Materials were mixed in accordance with the following composition to prepare Pigment Ink F2 for ink-jet recording.
Liquid Dispersion A2 prepared in Embodiment 6: 50 parts by weight;
1,5-Pentanediol: 13 parts by weight;
Ion-exchanged water: 37 parts by weight.

Comparative Test 7

Materials were mixed in accordance with the following composition to prepare Pigment Ink G2 for ink-jet recording.
Liquid Dispersion A2 prepared in Embodiment 6: 50 parts by weight;
Diethylene glycol: 13 parts by weight;
Ion-exchanged water: 37 parts by weight.

Comparative Test 8

The following composition was ground for 15 hours by using a planetary ball mill, and then it was dispersed to obtain Liquid Dispersion H2.
Magenta pigment (Chromofine Magenta 6887, produced by Dainichiseika Color & Chemicals Mfg.): 10 parts by weight;
Sodium naphthalenesulfonate-formalin condensate: 5 parts by weight;
Acetylenic glycol: 1.5 part by weight;
Ion-exchanged water: 80 parts by weight.

Materials were mixed in accordance with the following composition to prepare Pigment Ink H2 for ink-jet recording.
Liquid Dispersion-H2: 50 parts by weight;
Diethylene glycol: 7 parts by weight;
1,5-Pentanediol: 6 parts by weight;
Ion-exchanged water: 37 parts by weight.

Table 2 shows the particle diameter of the pigment in the ink obtained in the respective embodiments and tests, the viscosity, the presence or absence of head clogging and the printing quality.

TABLE 2

|  | Particle diameter (nm) | Viscosity (cps) | Clogging | Printing quality |
| --- | --- | --- | --- | --- |
| Embodiment 6 | 35 | 3.1 | A | 1.2 |
| Embodiment 7 | 36 | 3.6 | A | 1.2 |
| Embodiment 8 | 35 | 2.9 | A | 1.3 |
| Embodiment 9 | 38 | 3.4 | A | 1.2 |
| Com. Test 5 | 35 | 2.5 | C | <1.0 |
| Com. Test 6 | 35 | 3.5 | B | 1.0 |
| Com. Test 7 | 35 | 3.6 | C | 1.0 |
| Com. Test 8 | 60 | 5.3 | C | <1.0 |

In Table 2, the particle diameter of the pigment and the viscosity were measured with the apparatuses and under the conditions described in relation to Table 1. The head clogging was evaluated in the same manner as described in relation to Table 1. The printing quality was also measure with the same apparatus and under the same condition as those described above.

As clarified from Table 2, the pigment ink for ink-jet recording according to the present invention has a low viscosity, it causes no head clogging, and it is excellent in printing quality.

As for the pigment ink for ink-jet recording according to the present invention, even when the water content in the ink is evaporated, and the ink is solidified, then solid matters produced thereby have a soft property. Therefore, for example, when the cleaning operation is performed, the solid matters are easily peeled off. Accordingly, the nozzle is prevented from clogging, and the printing quality is excellent.

What is claimed is:

1. An ink comprising (A) a pigment, (B) a polyethylene oxide-containing dispersing agents (C) at least one water-soluble organic solvent selected from the group consisting of ethylene glycol, diethylene glycol, and glycerol, (D) polyethylene oxides and (E) water.

2. The ink according to claim 1, wherein a weight ratio of (A) the pigment to (B) the polyethylene oxide-containing dispersing agent is 1:2 to 3:1.

3. The ink according to claim 1, wherein (B) the polyethylene oxide-containing dispersing agent has a molecular weight of 1000 to 5000.

4. The ink according to claim 1, wherein a weight ratio of (B) the polyethylene oxide-containing dispersing agent to (D) the polyethylene oxide is within a range of 1:5 to 1:1.

5. The ink according to claim 1, wherein a weight ratio of (C) at least one water-soluble organic solvent selected from the group consisting of ethylene glycol, diethylene glycol, and glycerol to (D) the polyethylene within a range of 2:1 to 1:5.

6. The ink according to claim 1, wherein (C) at least one water-soluble organic solvent selected from the group consisting of ethylene glycol, diethylene glycol, and glycerol and (D) the polyethylene oxide are contained in an amount of 8 to 16% by weight with respect to a total amount of the ink.

7. The ink according to claim 1, wherein (D) the polyethylene oxide has a molecular weight of 200 to 2000.

8. The ink according to claim 1, wherein the ink is a pigment ink for ink-jet recording.

9. An ink comprising (A) a pigment, (B) a polyethylene oxide-containing dispersing agent, (C) at least one water-soluble organic solvent selected from the group consisting of ethylene glycol, diethylene glycol, and glycerol, (F) a water-soluble compound having a structure in which two or three hydroxyl groups are joined to a hydrocarbon having a number of carbons of 4 to 6, and (E) water.

10. The ink according to claim 9, wherein (F) the water-soluble compound is one compound selected from the group consisting of 1,2-butanediol, 1,4-butanediol, 1,3-butanediol, 2,4-pentanediol, 1,5-pentanediol, 2-methyl-2,4-pentanediol, 1,2-cyclohexanediol, 1,4-cyclohexanediol, trimethylolethane, trimethylolpropane, 1,2,4-butanetriol, 1,2,6-hexanetriol, 1,2,5-pentanetriol, 3-methyl-1 5-pentanediol, and 3-hexene-2,5-diol.

11. The ink according to claim 9, wherein (C) at least one water-soluble organic solvent selected from the group consisting of ethylene glycol, diethylene glycol, and glycerol and (F) the water-soluble compound are contained in an amount of 8 to 16% by weight with respect to a total amount of the ink.

12. The ink according to claim 9, wherein a weight ratio of (C) at least one water-soluble organic solvent selected from the group consisting of ethylene glycol, diethylene glycol, and glycerol to (F) the water-soluble compound is within a range of 2:1 to 1:5.

13. The ink according to claim 9, wherein a weight ratio of (B) the polyethylene oxide-containing dispersing agent to (F) the water-soluble compound is within a range of 1:5 to 1:1.

14. The ink according to claim 9, wherein (B) the polyethylene oxide-containing dispersing agent has a molecular weight of 1000 to 5000.

15. The ink according to claim 9, wherein a weight ratio of (A) the pigment to (B) the polyethylene oxide-containing dispersing agent is 1:2 to 3:1.

16. The ink according to claim 9, wherein the ink is a pigment ink for ink-jet recording.

* * * * *